US012755900B2

(12) United States Patent
Nakamura et al.

(10) Patent No.: US 12,755,900 B2
(45) Date of Patent: Oct. 6, 2026

(54) CAPACITOR MODULE

(71) Applicants: Murata Manufacturing Co., Ltd., Nagaokakyo (JP); Shizuki Electric Co., Inc., Nishinomiya (JP)

(72) Inventors: Hiroaki Nakamura, Nagaokakyo (JP); Hiroki Kitamura, Nishinomiya (JP)

(73) Assignees: MURATA MANUFACTURING CO., LTD., Nagaokakyo (JP); SHIZUKI ELECTRIC CO., INC., Nishinomiya (JP)

( * ) Notice: Subject to any disclaimer, the term of this patent is extended or adjusted under 35 U.S.C. 154(b) by 458 days.

(21) Appl. No.: 18/461,795

(22) Filed: Sep. 6, 2023

(65) Prior Publication Data

US 2023/0420185 A1 Dec. 28, 2023

Related U.S. Application Data

(63) Continuation of application No. PCT/JP2022/003632, filed on Jan. 31, 2022.

(30) Foreign Application Priority Data

Mar. 12, 2021 (JP) ................................ 2021-040324

(51) Int. Cl.
*H01G 2/02* (2006.01)
*H01G 2/14* (2006.01)
(Continued)

(52) U.S. Cl.
CPC ................ *H01G 2/02* (2013.01); *H01G 2/14* (2013.01); *H01G 4/32* (2013.01); *H01G 4/38* (2013.01)

(58) Field of Classification Search
CPC .. H01G 2/02; H01G 2/14; H01G 4/32; H01G 4/38
(Continued)

(56) References Cited

U.S. PATENT DOCUMENTS

2013/0003782 A1* 1/2013 Farago .................... H01G 4/40 374/E7.037
2013/0050878 A1 2/2013 Perez et al.
(Continued)

FOREIGN PATENT DOCUMENTS

JP 2003087941 A 3/2003
JP 2009111370 A 5/2009
(Continued)

OTHER PUBLICATIONS

International Search Report in PCT/JP2022/003632, mailed Apr. 19, 2022, 3 pages.

*Primary Examiner* — Arun Ramaswamy
(74) *Attorney, Agent, or Firm* — ArentFox Schiff LLP

(57) ABSTRACT

A capacitor module that includes: a first capacitor; a second capacitor; a first bus bar having a support surface supporting the first capacitor and the second capacitor such that a first side surface of the first capacitor and a second side surface of the second capacitor face each other in a first direction along the support surface and define a space separating a curved portion of the first side surface and a curved portion of the second side surface in the first direction, the first bus bar electrically connected to a first electrode of the first capacitor and a third electrode of the second capacitor; a second bus bar electrically connected to a second electrode of the first capacitor and a fourth electrode of the second capacitor; and a sensor including a detector arranged in the space.

10 Claims, 18 Drawing Sheets

(51) Int. Cl.
*H01G 4/32* (2006.01)
*H01G 4/38* (2006.01)

(58) Field of Classification Search
USPC .................................................. 361/502, 503
See application file for complete search history.

(56) References Cited

U.S. PATENT DOCUMENTS

| | | | | |
|---|---|---|---|---|
| 2013/0222967 | A1* | 8/2013 | Imamura .................. | H01G 4/38<br>361/301.3 |
| 2014/0294045 | A1* | 10/2014 | Hironaka ............... | H01G 9/008<br>374/142 |
| 2016/0372264 | A1* | 12/2016 | Maeda ................ | H02M 7/5387 |
| 2019/0080850 | A1 | 3/2019 | Inazumi | |

FOREIGN PATENT DOCUMENTS

| | | | |
|---|---|---|---|
| JP | 2014170882 | A | 9/2014 |
| JP | 2020136428 | A | 8/2020 |
| WO | 2017204065 | A1 | 11/2017 |

* cited by examiner

CAPACITOR MODULE

CROSS REFERENCE TO RELATED APPLICATIONS

The present application is a continuation of International application No. PCT/JP2022/003632, filed Jan. 31, 2022, which claims priority to Japanese Patent Application No. 2021-040324, filed Mar. 12, 2021, the entire contents of each of which are incorporated herein by reference.

TECHNICAL FIELD

The present invention relates to a capacitor module.

BACKGROUND ART

In a capacitor module in which a plurality of capacitors are arranged side by side and accommodated in a case, a failure may occur due to heat generation, overcurrent, or the like of the capacitors.

Therefore, as in Patent Document 1, a capacitor module in which a temperature sensor is arranged in a case to detect an overheat state of a capacitor has been studied.

Patent Document 1: WO-2017/204065

SUMMARY OF THE INVENTION

The capacitor described in Patent Document 1 has a problem that downsizing of the capacitor module is difficult.

Therefore, an object of the present invention is to provide a capacitor module that can be easily downsized.

A capacitor module according to an aspect of the present invention comprises: a first capacitor having a wound body of a dielectric film and including a first electrode, a second electrode opposed to the first electrode, and a first side surface connecting the first electrode and the second electrode and having a pair of flat portions opposed to each other and a pair of curved portions connecting the pair of flat portions; a second capacitor having a wound body of a dielectric film and including a third electrode, a fourth electrode opposed to the third electrode, and a second side surface connecting the third electrode and the fourth electrode and having a pair of flat portions opposed to each other and a pair of curved portion connecting the pair of flat portions; a first bus bar having a support surface supporting the first side surface of the first capacitor and the second side surface of the second capacitor such that the first side surface of the first capacitor and the second side surface of the second capacitor face each other in a first direction along the support surface of the first bus bar and define a space separating one of the pair of curved portions of the first side surface and one of the pair of curved portions of the second side surface in the first direction between the first side surface of the first capacitor and the second side surface of the second capacitor, the first bus bar being electrically connected to the first electrode of the first capacitor and the third electrode of the second capacitor; a second bus bar electrically connected to the second electrode of the first capacitor and the fourth electrode of the second capacitor; and a sensor including a detector that detects an abnormality regarding the capacitor module, the detector being arranged in the space separating the one of the pair of curved portions of the first side surface and the one of the pair of curved portions of the second side surface.

According to the present invention, it is possible to provide a capacitor module that can be easily downsized.

Figure 1:
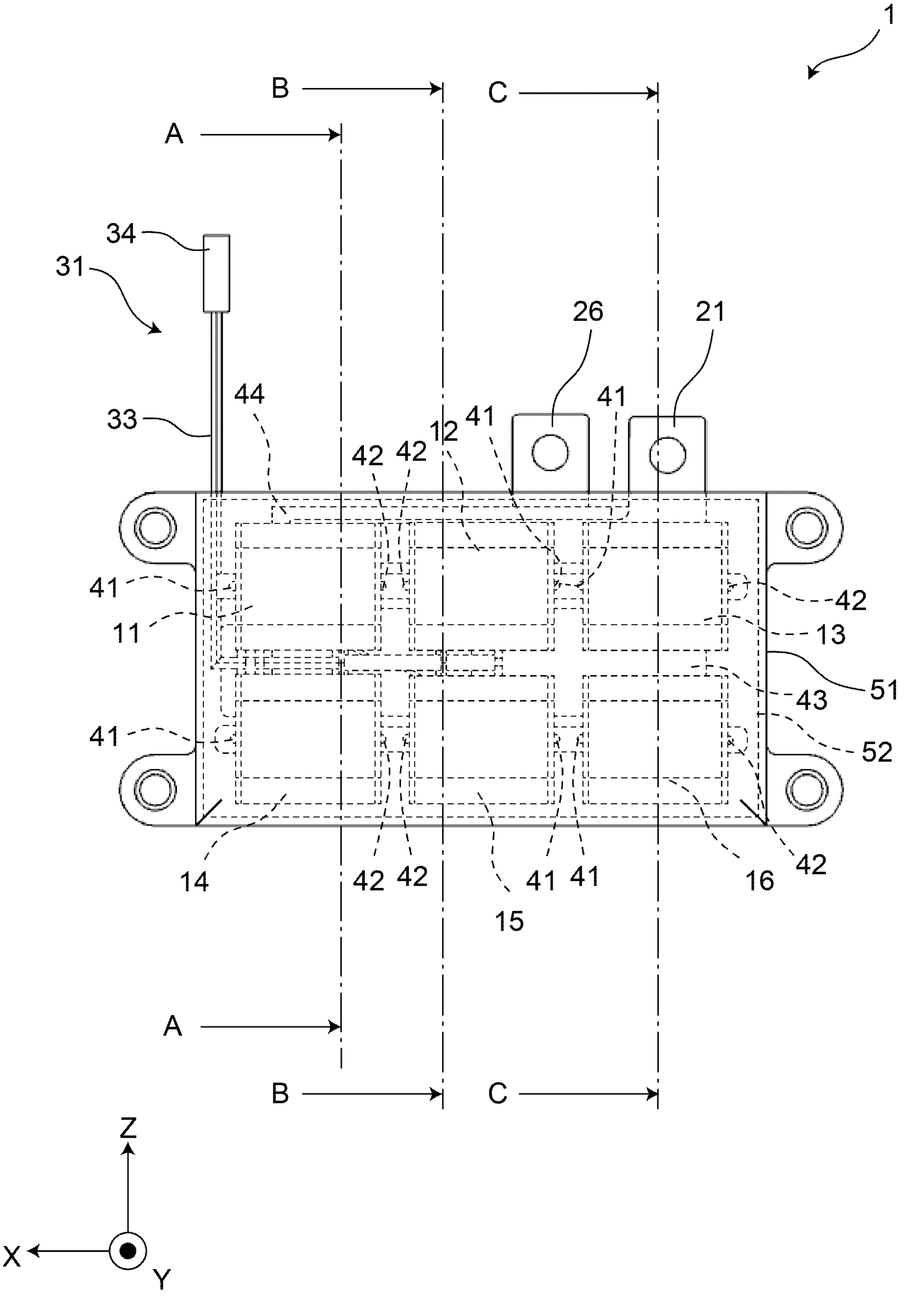
FIG. 1 is a plan view of a capacitor module according to a first embodiment of the present invention.

DETAILED DESCRIPTION OF THE PREFERRED EMBODIMENTS (Circumstances Leading to Present Improvement)

In a capacitor module, a capacitor arranged at the center is less likely to dissipate heat and has a higher temperature than other capacitors, which may cause a failure in operation of the capacitor. A failure may occur in the capacitor module due to overcurrent. Therefore, it has been studied to detect abnormality of a capacitor, such as high temperature or overcurrent, by arranging a sensor in a case as in the capacitor module described in Patent Document 1.

In the capacitor module described in Patent Document 1, a sensor accommodated in a holder made of resin is placed on the capacitor and arranged in the case. For this reason, the capacitor module itself becomes large due to the size of the holder, and there is a problem that downsizing of the capacitor module is difficult.

Therefore, the present inventors have studied a configuration of a capacitor module that can be easily downsized, and have reached the following.

A capacitor module according to an aspect of the present disclosure comprises: a first capacitor having a wound body of a dielectric film and including a first electrode, a second electrode opposed to the first electrode, and a first side surface connecting the first electrode and the second electrode and having a pair of flat portions opposed to each other and a pair of curved portions connecting the pair of flat portions; a second capacitor having a wound body of a dielectric film and including a third electrode, a fourth electrode opposed to the third electrode, and a second side surface connecting the third electrode and the fourth electrode and having a pair of flat portions opposed to each other and a pair of curved portions connecting the pair of flat portions; a first bus bar having a support surface supporting the first side surface of the first capacitor and the second side surface of the second capacitor such that the first side surface of the first capacitor and the second side surface of the second capacitor face each other in a first direction along the support surface of the first bus bar and define a space separating one of the pair of curved portions of the first side surface and one of the pair of curved portions of the second side surface in the first direction between the first side surface of the first capacitor and the second side surface of the second capacitor, the first bus bar being electrically connected to the first electrode of the first capacitor and the third electrode of the second capacitor; a second bus bar electrically connected to the second electrode of the first capacitor and the fourth electrode of the second capacitor; and a sensor including a detector that detects an abnormality regarding the capacitor module, the detector being arranged in the space separating the one of the pair of curved portions of the first side surface and the one of the pair of curved portions of the second side surface.

According to this configuration, it is possible to arrange the sensor using a dead space while enabling abnormality detection. Therefore, it is possible to provide a capacitor module that can be easily downsized without affecting the design of the capacitor module.

The sensor includes an elongated portion provided with a detector at a tip end of the elongated portion, and the elongated portion may be arranged in the space separating the one of the pair of curved portions of the first side surface and the one of the pair of curved portions of the second side surface.

According to this configuration, the detector can be arranged near the center of the capacitor module, and therefore the sensitivity of abnormality detection can be improved.

The first bus bar may include a positioning portion that positions the elongated portion on the support surface.

According to this configuration, it is not necessary to separately prepare a positioning component, and therefore the manufacturing cost can be suppressed.

The positioning portion may include a first protrusion protruding from the support surface, the first protrusion defining a through hole through which the elongated portion extends.

According to this configuration, the elongated portion of the sensor can be positioned in a radial direction.

The positioning portion may include a second protrusion protruding from the support surface and facing the detector of the elongated portion in an axial direction of the elongated portion.

According to this configuration, the elongated portion of the sensor can be positioned in the axial direction.

The first bus bar or the second bus bar may include an abutment portion supporting the elongated portion.

According to this configuration, the elongated portion of the sensor can be positioned in the axial direction.

The second bus bar may be arranged opposed to the support surface of the first bus bar, and the support member may be positioned in the second bus bar so as to not overlap the support surface of the first bus bar.

According to this configuration, it is possible to position the elongated portion of the sensor while utilizing the dead space in the case, which contributes to downsizing of the capacitor module.

The first capacitor and the second capacitor may be arranged such that the one of the pair of curved portions of the first capacitor and the one of the pair of curved portions of the second capacitor face each other in the first direction and one of the pair of the flat portions of the first side surface and one of the pair of the flat portions of the second side surface face the support surface.

By making the curved portion of the first capacitor and the second capacitor face each other, a space for arranging the sensor is provided. By arranging the sensor in the space, the capacitor module can be downsized without affecting the design of the capacitor module.

The detector of the sensor may be arranged between the position where the distance from the first side surface and the second side surface is the shortest and the support surface of the first bus bar.

According to this configuration, the sensor can be arranged using the dead space provided due to each of the curved portions of the first capacitor and the second capacitor. This contributes to downsizing of the capacitor module.

The sensor may be a temperature sensor, and the detector may be a heat-sensitive part that detects a temperature.

According to this configuration, overheating of the capacitor module can be detected.

The first embodiment according to the present invention will be described below with reference to the accompanying drawings. In each drawing, each element is exaggerated in order to facilitate the description.

First Embodiment

Figure 2:
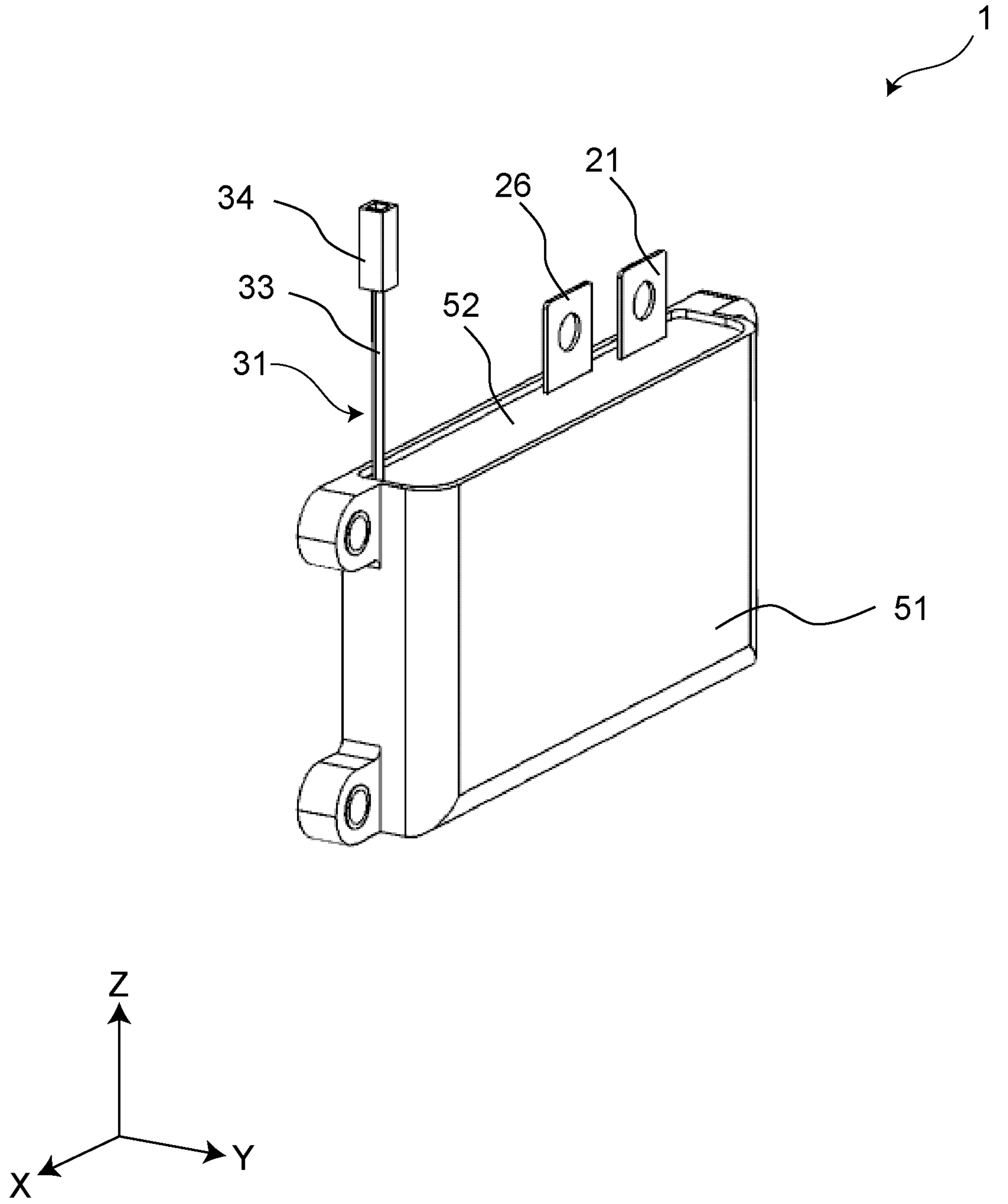
FIG. 2 is a perspective view of the capacitor module of FIG. 1.
Figure 3:
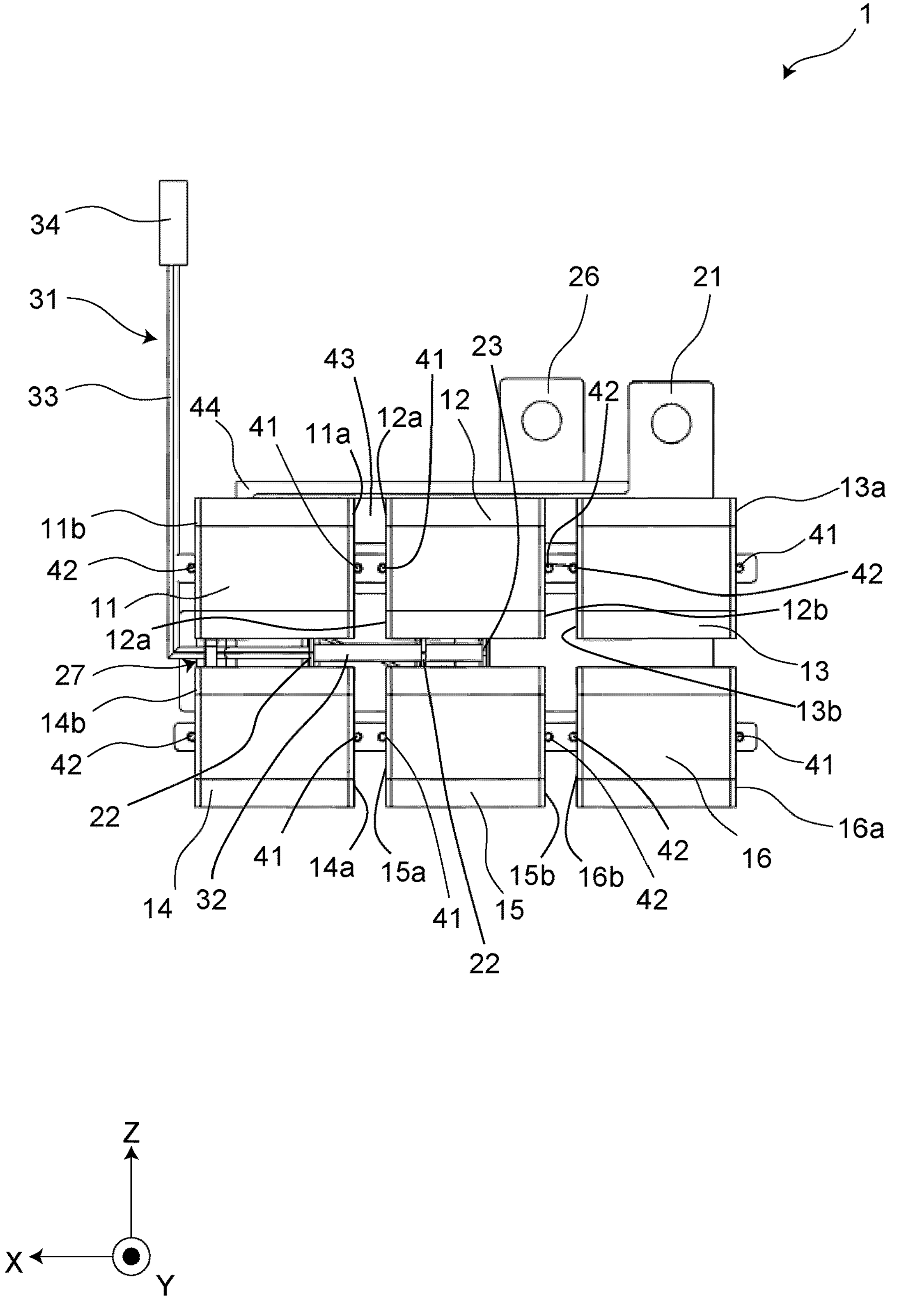
FIG. 3 is a plan view of the capacitor module of FIG. 1 where a case and a sealing resin are omitted.
Figure 4:
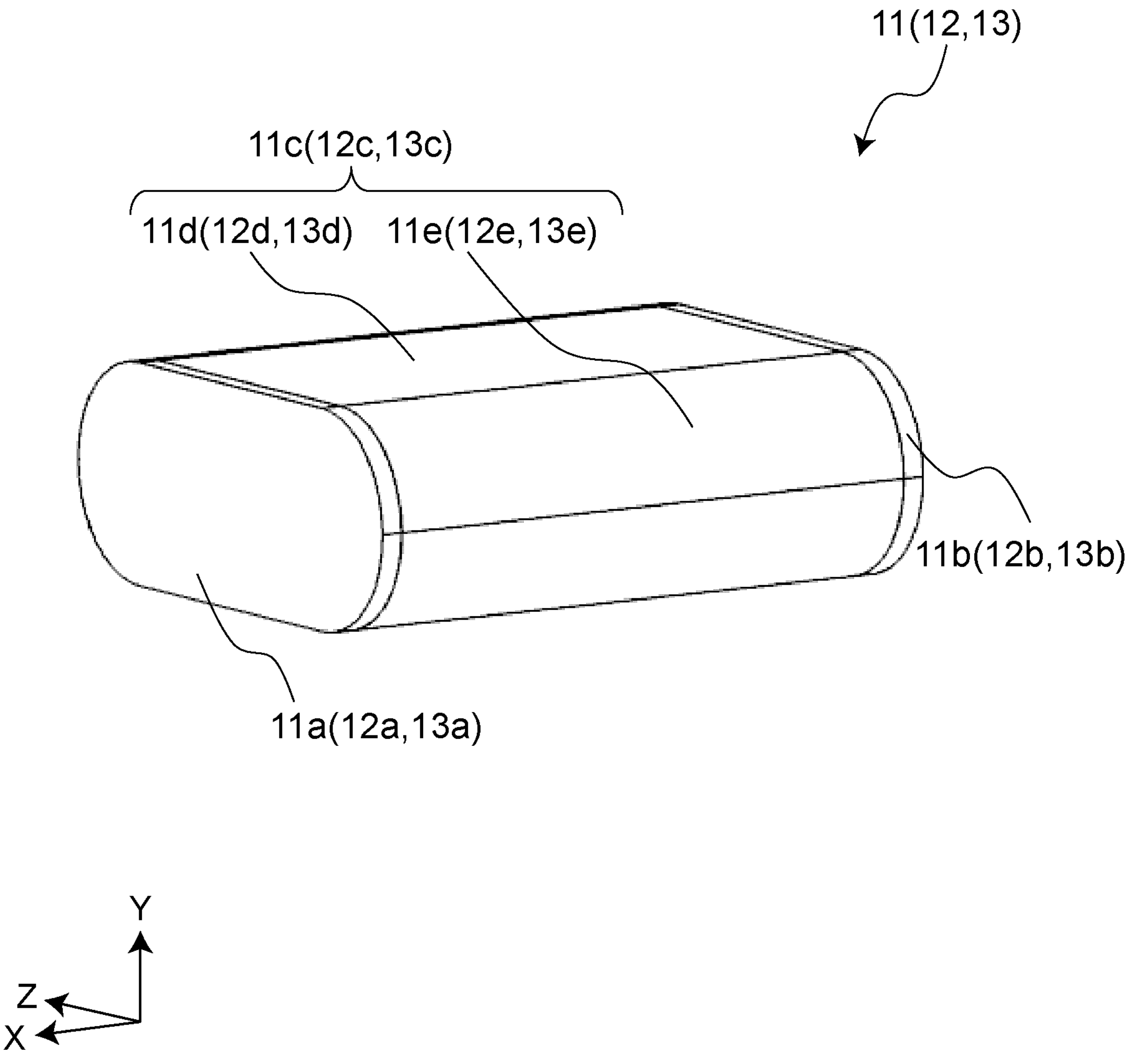
FIG. 4 is a perspective view showing a first capacitor of the capacitor module of FIG. 1.
Figure 5:
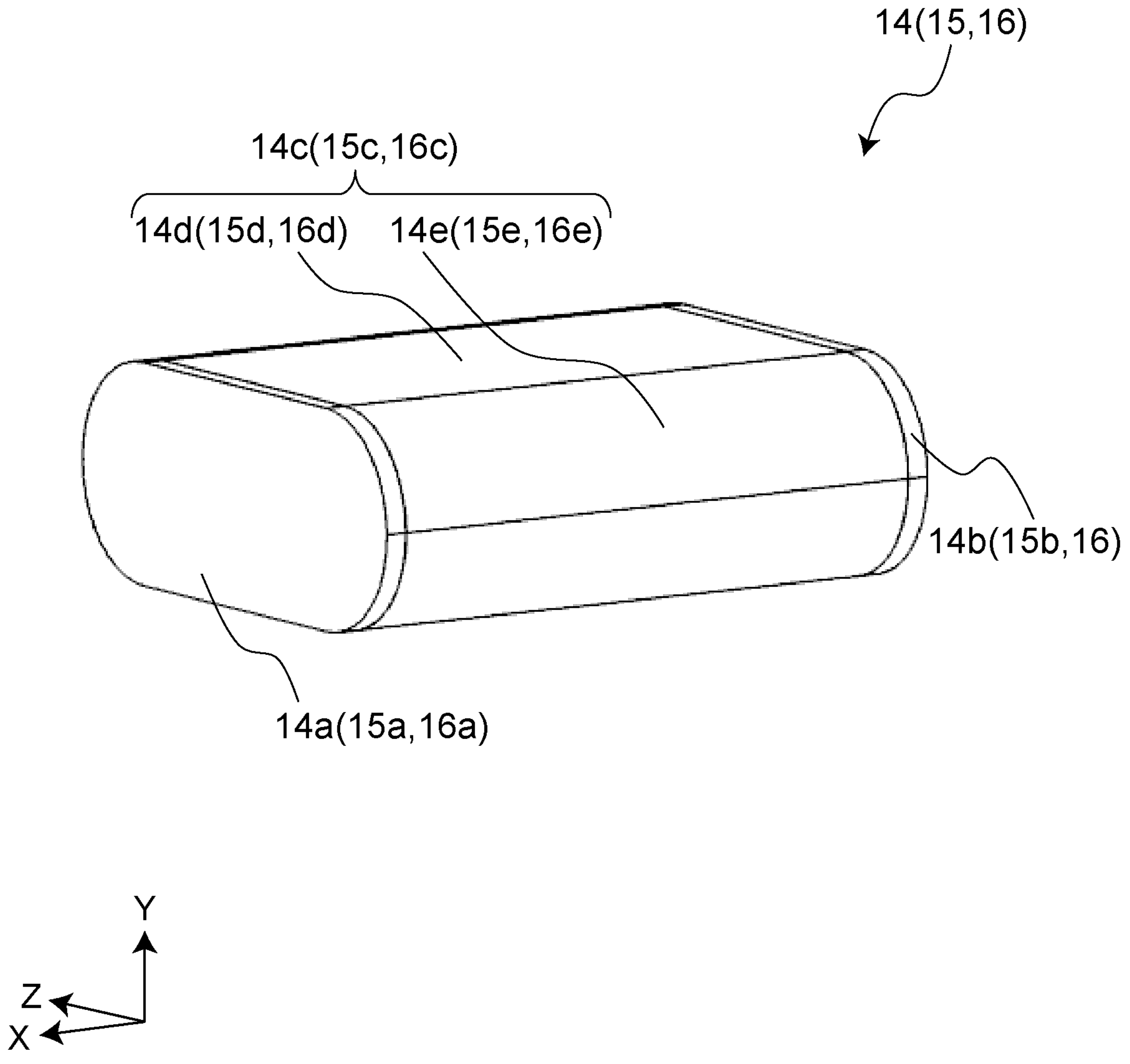
FIG. 5 is a perspective view showing a second capacitor of the capacitor module of FIG. 1.
Figure 6A:
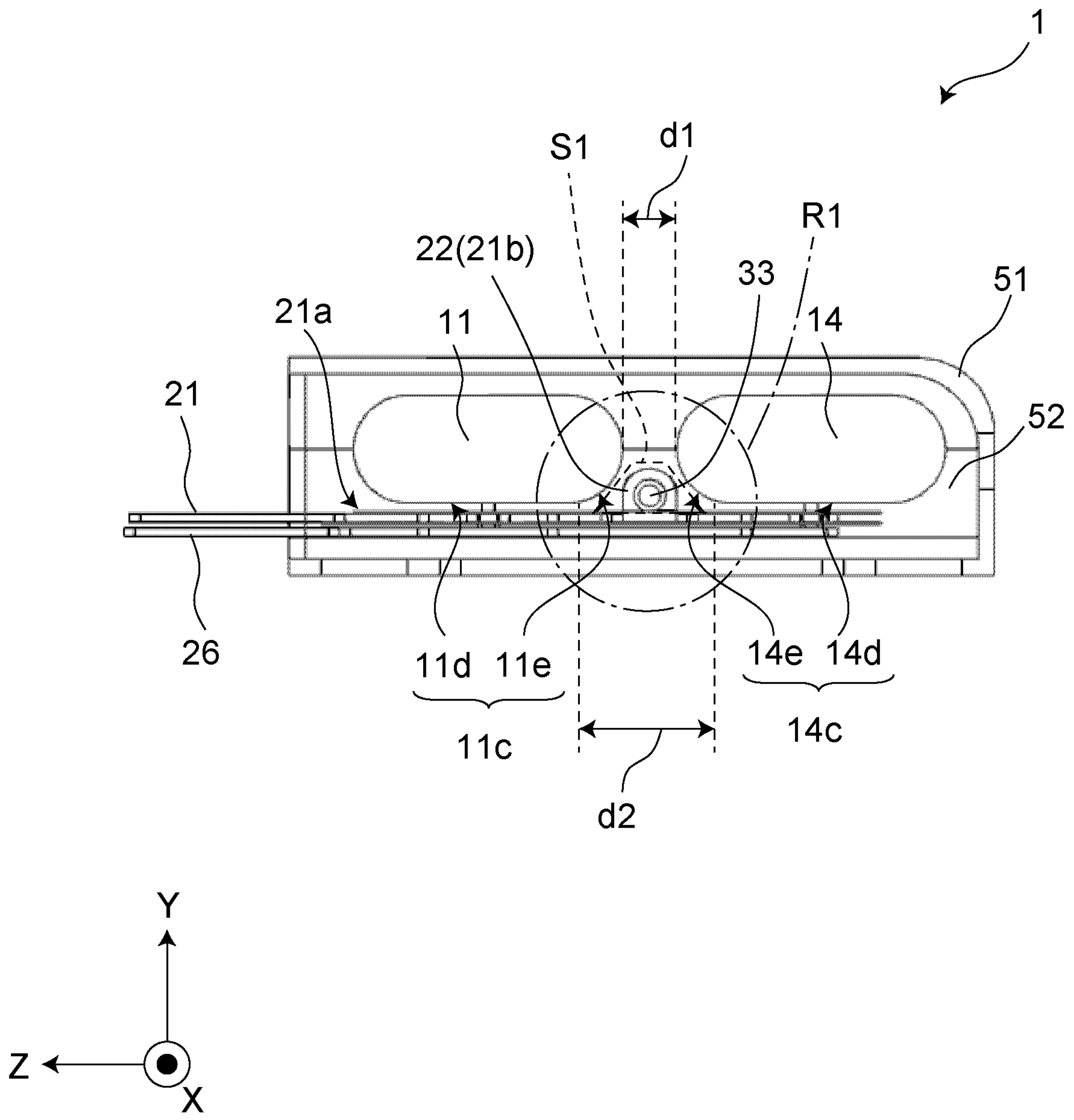
FIG. 6A is a cross-sectional view taken along line A-A of the capacitor module of FIG. 1.
Figure 6B:
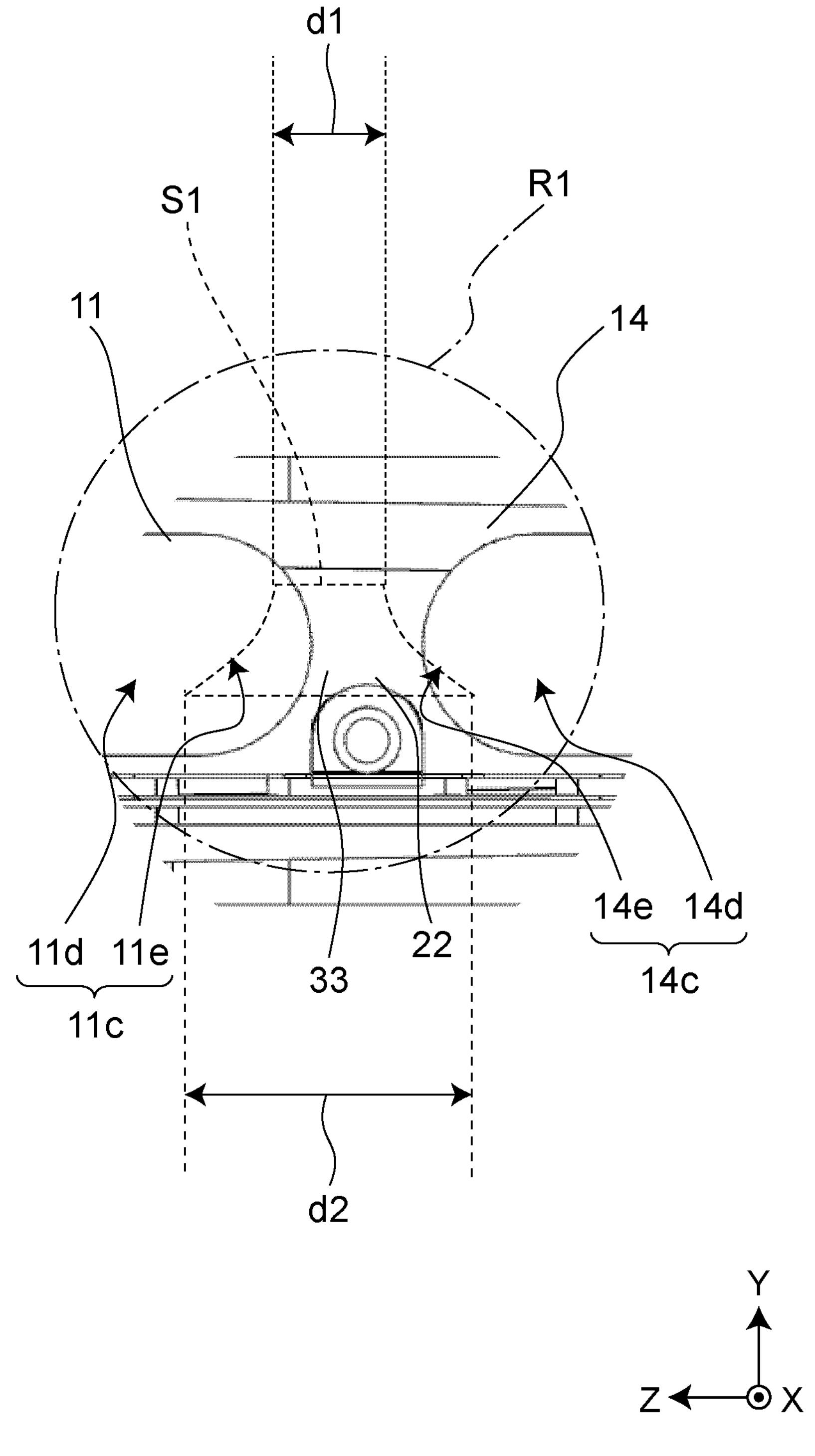
FIG. 6B is a partially enlarged view of FIG. 6A.
Figure 6C:
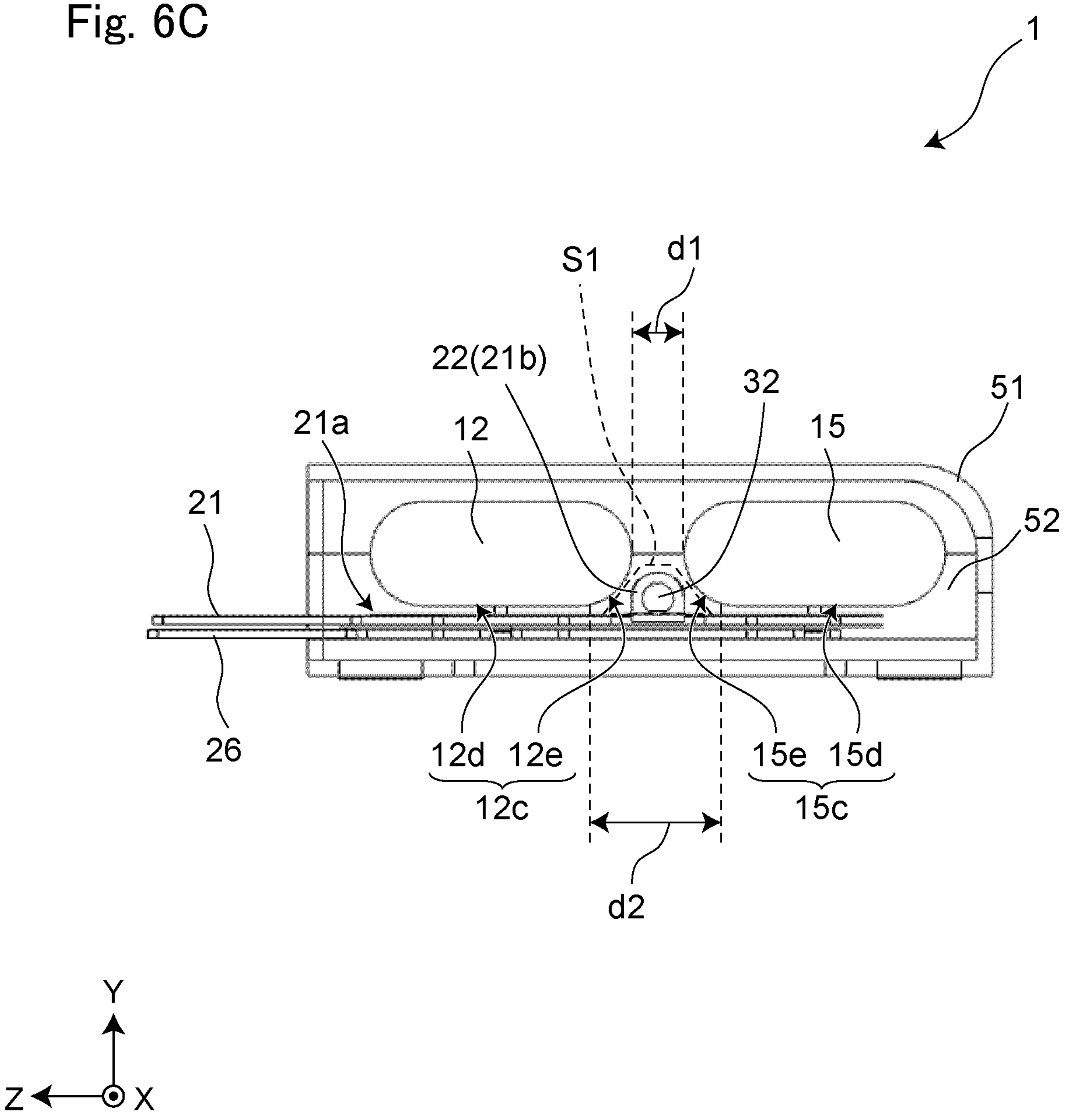
FIG. 6C is a cross-sectional view taken along line B-B of the capacitor module of FIG. 1.
Figure 6D:
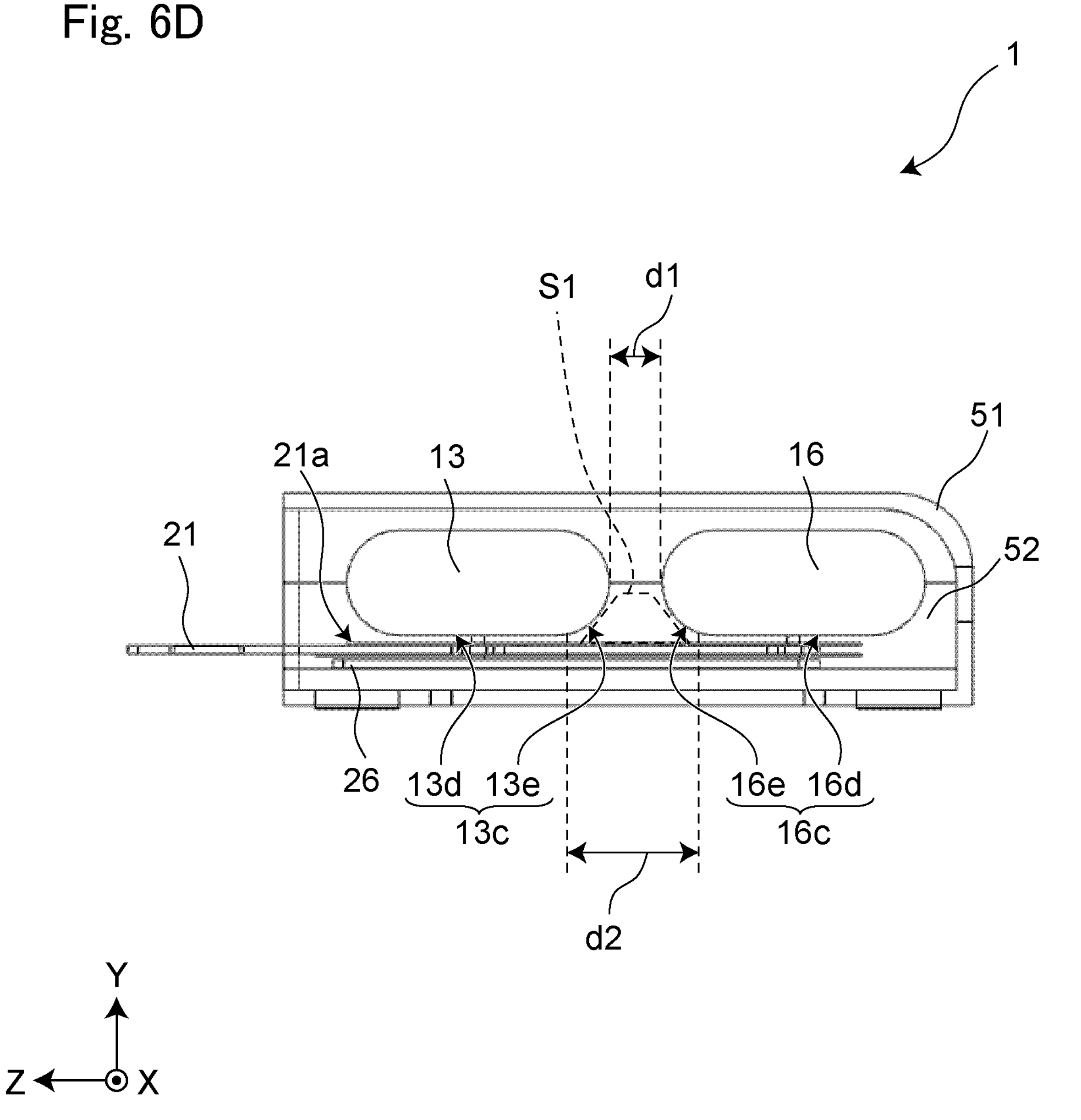
FIG. 6D is a cross-sectional view taken along line C-C of the capacitor module of FIG. 1.
Figure 7A:
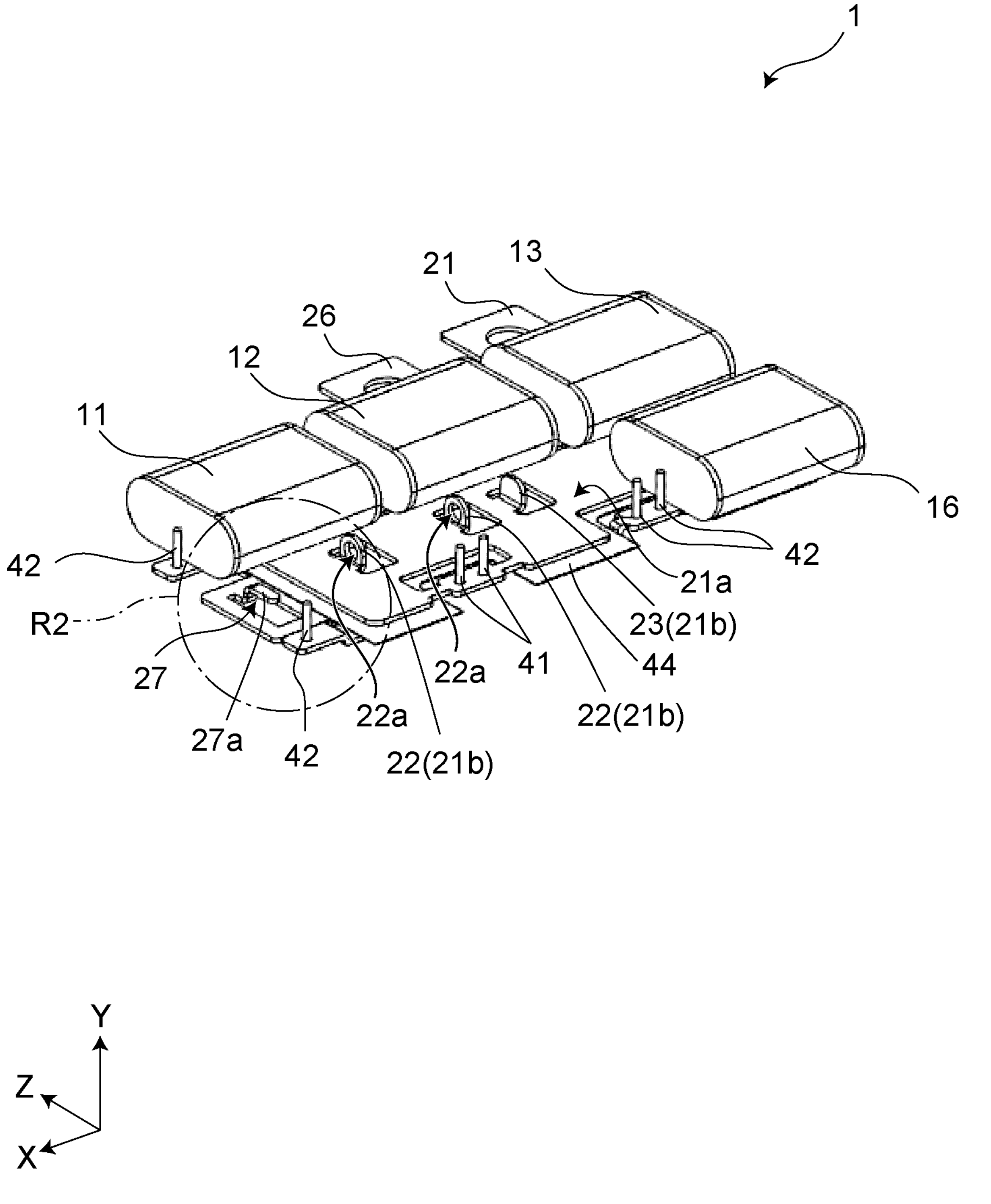
FIG. 7A is a perspective view showing a first protrusion, a second protrusion, and a support member of the capacitor module of FIG. 1.
Figure 7B:
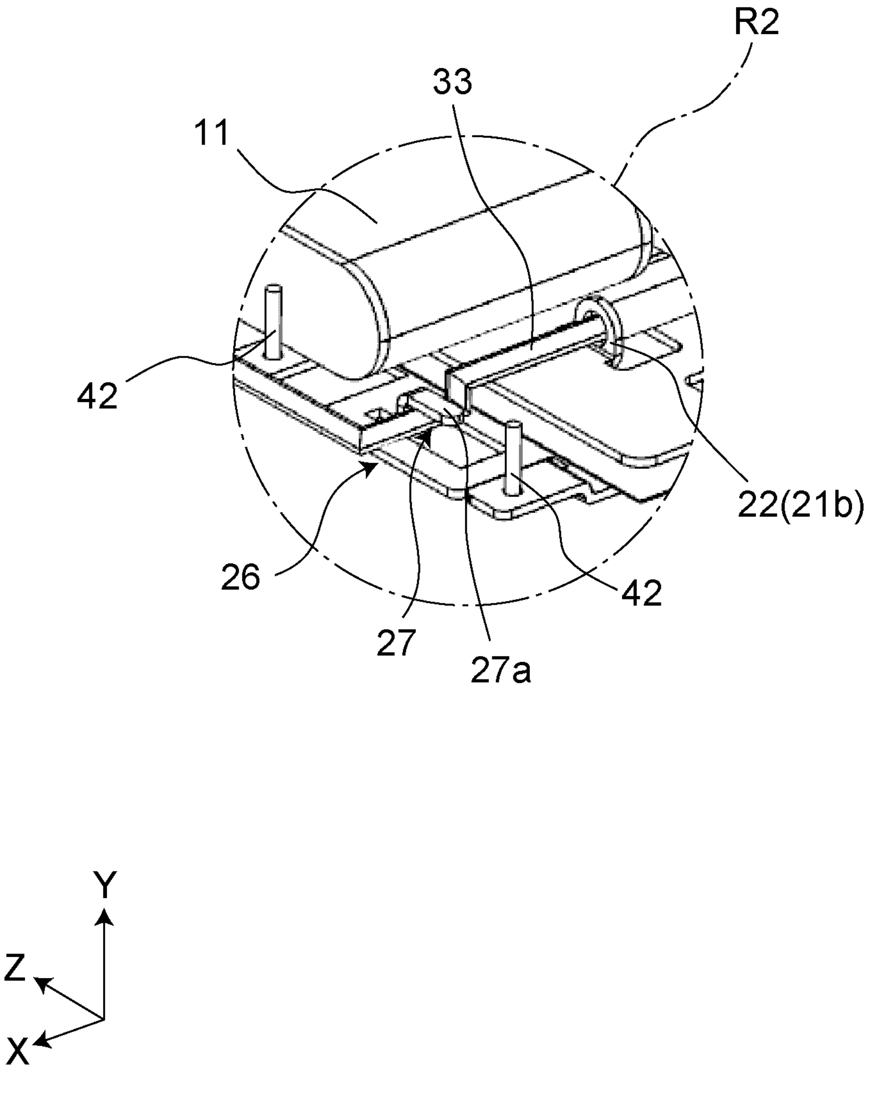
FIG. 7B is a partially enlarged view of FIG. 7A.
Figure 8:
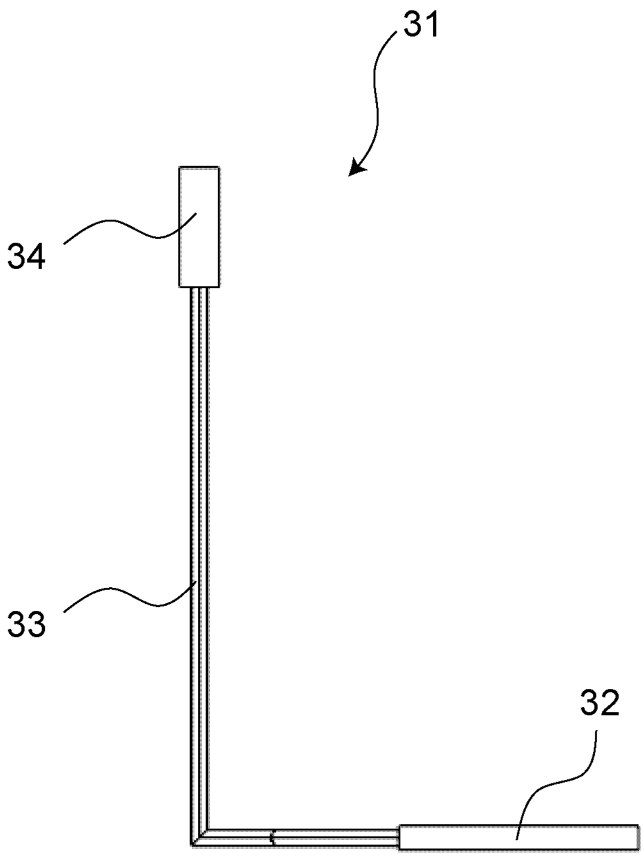
FIG. 8 is a perspective view showing a sensor of the capacitor module of FIG. 1.

FIG. 1 is a plan view of a capacitor module 1 according to the first embodiment of the present invention. FIG. 2 is a perspective view of the capacitor module 1 of FIG. 1. FIG. 3 is a plan view of the capacitor module 1 of FIG. 1 where a case 51 and a sealing resin 52 are omitted. FIG. 4 is a perspective view showing first capacitors 11 to 13 of the capacitor module 1 of FIG. 1. FIG. 5 is a perspective view showing second capacitors 14 to 16 of the capacitor module 1 of FIG. 1. FIG. 6A is a cross-sectional view taken along line A-A of the capacitor module 1 of FIG. 1. FIG. 6B is a partially enlarged view of FIG. 6A. FIG. 6C is a cross-sectional view taken along line B-B of the capacitor module 1 of FIG. 1. FIG. 6D is a cross-sectional view taken along line C-C of the capacitor module 1 of FIG. 1. FIG. 7A is a perspective view showing a first protrusion 22, a second protrusion 23, and a support member 27 of the capacitor module 1 of FIG. 1. FIG. 7B is a partially enlarged view of FIG. 7A. FIG. 8 is a perspective view showing a sensor 31 of the capacitor module 1 of FIG. 1. Note that X, Y, and Z directions in the drawings respectively indicate a lateral direction, a height direction, and a longitudinal direction of the capacitor module 1.

[Overall Configuration]

As shown in FIGS. 1 and 2, the capacitor module 1 includes the six capacitors 11 to 16, a first bus bar 21, a second bus bar 26, the sensor 31, the case 51, and the sealing resin 52. In the capacitor module 1, the case 51 made of resin accommodates the capacitors 11 to 16, a part of the first bus bar 21, a part of the second bus bar 26, and a part of the sensor 31, and the inside of the case 51 is filled with the sealing resin 52.

As shown in FIG. 3, the first bus bar 21 and the second bus bar 26 are connected to electrodes 11*a* to 16*a* and 11*b* to 16*b* of the six capacitors 11 to 16, respectively. External elements, circuits, or the like are connected to parts exposed from the case 51 in the first bus bar 21 and the second bus bar 26.

In the present embodiment, as shown in FIG. 3, the six capacitors are arranged in 3×2 rows inside the case 51 of the capacitor module 1. The capacitors 11 to 13 in the first row correspond to the "first capacitor", and the capacitors 14 to 16 in the second row correspond to the "second capacitor". Hereinafter, the capacitors 11 to 13 may be referred to as the first capacitors 11 to 13, and the capacitors 14 to 16 may be referred to as the second capacitors 14 to 16.

<First Capacitors>

The first capacitors 11 to 13 are film capacitors formed by winding a dielectric film having a metal-evaporated film arranged on a surface and pressing a wound body of the dielectric film into a flat shape. As shown in FIG. 4, the first capacitor 11 includes the first electrode 11*a*, the second electrode 11*b*, and a first side surface 11*c* connecting the first electrode 11*a* and the second electrode 11*b*. The first side surface 11*c* of the first capacitor 11 includes a pair of flat portions 11*d* and a pair of curved portions 11*e*. Similarly, the second capacitor 12 includes the first electrode 12*a*, the second electrode 12*b*, and a first side surface 12*c* connecting the first electrode 12*a* and the second electrode 12*b*. The first side surface 12*c* of the first capacitor 12 includes a pair of flat portions 12*d* and a pair of curved portions 12*e*. The first capacitor 13 includes a first electrode 13*a*, a second electrode 13*b*, and a first side surface 13*c* connecting the first electrode 13*a* and the second electrode 13*b*. The first side surface 13*c* of the first capacitor 13 includes a pair of flat portions 13*d* and a pair of curved portions 13*e*.

As the dielectric film of the first capacitors 11 to 13, for example, a plastic film such as polyethylene terephthalate, polypropylene, polyphenylene sulfide, or polyethylene naphthalate can be used. As the metal-evaporated film arranged on the surface of the plastic film, Al, Zn, or the like can be used. The first electrodes 11*a* to 13*a* and the second electrodes 11*b* to 13*b* are formed at the end part of the wound dielectric film by, for example, thermally spraying Zn or the like.

As shown in FIG. 3, the first capacitor 11 and the first capacitor 12 are arranged such that the first electrode 11*a* and the first electrode 12*a* of the first capacitor 11 and the first capacitor 12, respectively, face each other. The first capacitor 12 and the first capacitor 13 are arranged such that the second electrode 12*b* and the second electrode 13*b* of the first capacitor 12 and the first capacitor 13, respectively, face each other.

<Second Capacitors>

The second capacitors 14 to 16 are film capacitors formed by winding a dielectric film having a metal-evaporated film arranged on a surface and pressing a wound body of the dielectric film into a flat shape. The second capacitors 14 to 16 have the same shapes as the first capacitors 11 to 13, respectively. As shown in FIG. 5, the second capacitor 14 includes a third electrode 14*a*, a fourth electrode 14*b*, and a second side surface 14*c* connecting the third electrode 14*a* and the fourth electrode 14*b*. The second side surface 14*c* of the second capacitor 14 includes a pair of flat portions 14*d* and a pair of curved portions 14*e*. Similarly, the second capacitor 15 includes a third electrode 15*a*, a fourth electrode 15*b*, and a second side surface 15*c* connecting the third electrode 15*a* and the fourth electrode 15*b*. The second side surface 15*c* of the second capacitor 15 includes a pair of flat portions 15*d* and a pair of curved portions 15*e*. The second capacitor 16 includes a third electrode 16*a*, a fourth electrode 16*b*, and a second side surface 16*c* connecting the third electrode 16*a* and the fourth electrode 16*b*. The second side surface 16*c* of the second capacitor 16 includes a pair of flat portions 16*d* and a pair of curved portions 16*e*.

As the dielectric film of the second capacitors 14 to 16, for example, a plastic film such as polyethylene terephthalate, polypropylene, polyphenylene sulfide, or polyethylene naphthalate can be used. As the metal-evaporated film arranged on the surface of the plastic film, Al, Zn, or the like can be used. The third electrodes 14*a* to 16*a* and the fourth electrodes 14*b* to 14*b* are formed at the end part of the wound dielectric film by, for example, thermally spraying Zn or the like.

As shown in FIG. 3, the second capacitor 14 and the second capacitor 15 are arranged such that the third electrode 14*a* and the third electrode 15*a* of the second capacitor 14 and the second capacitor 15, respectively, face each other. The second capacitor 15 and the second capacitor 16 are arranged such that the fourth electrode 15*b* and the fourth electrode 16*b* of the second capacitor 15 and the second capacitor 16, respectively, face each other.

The first capacitors 11 to 13 and the second capacitors 14 to 16 are arranged on a support surface 21*a* of the first bus bar 21 described later in a state where the first side surfaces 11*c* to 13*c* and the second side surfaces 14*c* to 16*c* face each other in the first direction (Z direction). That is, the first side surface 11*c* of the first capacitor 11 and the second side surface 14*c* of the second capacitor 14 are arranged on the support surface 21*a* with facing each other in the first direction. Similarly, the first capacitor 12 and the second capacitor 15 are arranged on the support surface 21*a* in a state where the first side surface 12*c* and the second side surface 15*c* face each other in the first direction. The first capacitor 13 and the second capacitor 16 are arranged on the support surface 21*a* in a state where the first side surface 13*c* and the second side surface 16*c* face each other in the first direction. Note that the first direction is a direction along the support surface 21*a* of the first bus bar 21, and is the Z direction in the present embodiment.

In the present embodiment, in particular, the curved portions 11*e* to 13*e* of the first side surfaces 11*c* to 13*c* and the curved portions 14*e* to 16*e* of the second side surfaces 14*c* to 16*c* are arranged to face each other in the first direction.

<First Bus Bar>

The first bus bar 21 is a plate-shaped conductive member electrically connected to the first electrodes 11*a* to 13*a* of the first capacitors 11 to 13 and the third electrodes 14*a* to 16*a* of the second capacitors 14 to 16. As shown in FIGS. 3 and 7A, the first bus bar 21 is electrically connected to the first electrodes 11*a* to 13*a* and the third electrodes 14*a* to 16*a* by soldering conductive pins 41 to the respective electrodes. Note that in FIG. 7A, the second capacitors 14 and 15 and the sensor 31 are omitted.

The first bus bar 21 includes the support surface 21*a* supporting the first side surfaces 11*c* to 13*c* of the first capacitors 11 to 13 and the second side surfaces 14*c* to 16*c* of the second capacitors 14 to 16 (see FIG. 7A).

Although not shown in FIGS. 7A, 6A, 6B, and the like, an insulating paper 43 is arranged on the support surface 21*a* of the first bus bar 21 (see FIG. 3 showing the insulating paper 43). The insulating paper 43 electrically insulates the electrodes 11*a* to 16*a* and 11*b* to 16*b* of the first capacitors 11 to 13 and the second capacitors 14 to 16, respectively, from the first bus bar 21.

In the present embodiment, as shown in FIGS. 6A and 6B, in a state where the curved portion 11*e* of the first capacitor 11 and the curved portion 14*e* of the second capacitors 14 to 16 face each other, one of each of the flat portions 11*d* and 14*d* of the capacitors 11 and 14 are arranged so as to face the support surface 21*a*. That is, the first capacitor 11 and the second capacitor 14 are arranged such that the flat portion 11*d* of the first side surface 11*c* and the flat portion 14*d* of the second side surface 14*c* face the support surface 21*a*, and the curved portion 11*e* and the curved portion 14*e* face each other in the first direction (Z direction).

Similarly, as shown in FIG. 6C, the first capacitor 12 and the second capacitor 15 are arranged such that the flat portion 12*d* of the first side surface 12*c* and the flat portion 15*d* of the second side surface 15*c* face the support surface 21*a*, and the curved portion 12*e* and the curved portion 15*e* face each other in the first direction (Z direction). As shown in FIG. 6D, the first capacitor 13 and the second capacitor 16 are arranged such that the flat portion 13*d* of the first side surface 13*c* and the flat portion 16*d* of the second side surface 16*c* face the support surface 21*a*, and the curved portion 13*e* and the curved portion 16*e* face each other in the first direction (Z direction).

As shown in FIGS. 6A and 6B, a space S1 separating the curved portion 11*e* of the first side surface 11*c* and the curved portion 14*e* of the second side surface 14*c* from each other in the first direction (Z direction) is provided between the first side surface 11*c* of the first capacitor 11 and the second side surface 14*c* of the second capacitor 14. That is, the distance between the curved portion 11*e* of the first side surface 11*c* and the curved portion 14*e* of the second side surface 14*c* increases from the position where the distance becomes a shortest distance d1 toward the support surface 21*a* of the first bus bar 21, and becomes a distance d2 near the support surface 21*a*. Therefore, the space S1 is provided between the first capacitor 11 and the second capacitor 14. An elongated portion 33 of the sensor 31 described later is arranged in the space S1 provided between the position where the interval between the first side surface 11*c* of the first capacitor 11 and the second side surface 14*c* of the second capacitor 14 becomes the shortest distance (distance d1) and the support surface 21*a* of the first bus bar 21. That is, the elongated portion 33 of the sensor 31 is arranged in a part (space S1) surrounded by the curved portion 11*e* of the first capacitor 11, the curved portion 14*e* of the second capacitor 14, and the support surface 21*a*. Similarly, the space 51 is also provided between the first capacitor 12 and the second capacitor 15 and between the first capacitor 13 and the second capacitor 16. By arranging the elongated portion 33 of the sensor 31 described later in this space 51, it is possible to arrange the sensor 31 while utilizing the dead space, and it is possible to downsize the capacitor module 1 without affecting the design of the capacitor module 1.

As shown in FIG. 7A, the first bus bar 21 includes a positioning portion 21*b* for positioning the elongated portion 33 (see FIG. 3) of the sensor 31. The positioning portion 21*b* includes a first protrusion 22 and a second protrusion 23.

Both the first protrusion 22 and the second protrusion 23 are protrusions protruding in a Y direction from the support surface 21*a* of the first bus bar 21. The first protrusion 22 and the second protrusion 23 can be formed by, for example, press working or the like. Although not shown in FIG. 7A, a hole through which the first protrusion 22 and the second protrusion 23 pass is provided in the insulating paper 43 arranged on the support surface 21*a* of the first bus bar 21.

The first protrusion 22 partially protrudes from the support surface 21*a* to form a through hole 22*a* through which the elongated portion 33 of the sensor 31 is inserted. The first protrusion 22 positions the elongated portion 33 in a radial direction perpendicular with respect to the axial direction (X direction). The through hole 22*a* is provided to be larger than the diameters of the detector 32 and the elongated portion 33 of the sensor 31. In this case, the sensor 31 can be easily inserted into the through hole 22*a*, and damage to the sensor 31 can also be suppressed. Alternatively, the through hole 22*a* may be provided to have substantially the same size as the diameters of the detector 32 and the elongated portion 33 of the sensor 31. In this case, the positioning accuracy of the sensor 31 can be improved.

The second protrusion 23 partially protrudes from the support surface 21*a*, and facing the detector 32 (see FIG. 3) of the elongated portion 33 in the axial direction of the elongated portion 33. The second protrusion 23 positions the elongated portion 33 in the axial direction (−X direction).

Similarly to the elongated portion 33 of the sensor 31, the first protrusion 22 and the second protrusion 23 are arranged in the space 51 (see FIG. 6B). As shown in FIG. 7A, one first protrusion 22 is arranged in the space 51 between the first capacitor 11 and the second capacitor 14, and the other first protrusion 22 and the second protrusion 23 are arranged in the space S1 between the first capacitor 12 and the second capacitor 15.

<Second Bus Bar>

The second bus bar 26 is a plate-shaped conductive member electrically connected to the second electrodes 11*b* to 13*b* of the first capacitors 11 to 13 and the fourth electrodes 14*b* to 16*b* of the second capacitors 14 to 16. As shown in FIG. 3, the second bus bar 26 is electrically connected to the second electrodes 11*b* to 13*b* and the fourth electrodes 14*b* to 16*b* by soldering conductive pins 42 to the respective electrodes. The second bus bar 26 is arranged opposed to the support surface 21*a* with respect to the first bus bar 21. As shown in FIG. 1, in order to insulate the first bus bar 21 from the second bus bar 26, an insulating paper 44 is arranged between the first bus bar 21 and the second bus bar 26.

As shown in FIG. 7B, an outer edge part of the second bus bar 26 is provided with a support member 27. The support member 27 is a portion abutting on an outer peripheral part of the elongated portion 33 (see FIG. 3) of the sensor 31. The support member 27 is provided on the second bus bar 26 at a position not overlapping the support surface 21*a* of the first bus bar 21. Similarly to the first protrusion 22 and the second protrusion 23, the support member 27 can be formed by, for example, press working or the like.

A claw 27*a* is provided on the support member 27. By hooking the elongated portion 33 on the claw 27*a* and pressing the claw 27*a* toward the second bus bar 26, it is possible to position the elongated portion 33. Therefore, it is possible to suppress the movement of the elongated portion 33 in the X direction.

By providing the support member 27, it is possible to regulate the position of the elongated portion 33 so as not to come into contact with the first electrode 11*a* of the first capacitor 11 or the third electrode 14*a* of the second capacitor 14 when the elongated portion 33 engaged with the positioning portion 21*b* is pulled out of the case 51. By providing the support member 27 at a position in the second bus bar 26 not overlapping the support surface 21*a* of the first bus bar 21, it is not necessary to provide a through hole in the insulating paper 43 and it is possible to simplify the configuration as compared with the case where the support member is provided at a position overlapping the support surface 21*a*. The dimension in the Y direction can be shortened.

In the present embodiment, the support member 27 can be formed by, for example, press working or the like.

<Sensor>

The sensor 31 is a sensor including a detector for detecting an abnormality regarding the capacitor module 1. Examples of the abnormality regarding the capacitor module 1 include overheating, overcurrent, and overvoltage. In the present embodiment, the sensor 31 is a temperature sensor that detects a temperature. As shown in FIG. 8, the sensor 31 includes the elongated portion 33 provided with the detector 32 at the tip end of the elongated portion 33. The elongated portion 33 is a portion formed into a rod shape or a linear shape. The sensor 31 includes a connection portion 34.

As shown in FIGS. 3 and 6A, parts of the detector 32 and the elongated portion 33 of the sensor 31 are arranged on the support surface 21*a* of the first bus bar 21. In the present embodiment, parts of the detector 32 and the elongated portion 33 are inserted into the through hole 22*a* of the first protrusion 22 of the first bus bar 21. Therefore, the elongated portion 33 can be positioned in the radial direction (direction parallel to a YZ plane).

As shown in FIG. 3, the detector 32, which is the tip end of the sensor 31, abuts in the X direction with respect to the second protrusion 23. This regulates a part of the elongated portion 33 from moving in the −X direction by the second protrusion 23. Furthermore, the elongated portion 33 is hooked and positioned on the support member 27 of the second bus bar 26.

That is, the detector 32 and the elongated portion 33 of the sensor 31 are positioned by the first protrusion 22, the second protrusion 23, and the support member 27.

In the capacitor module 1, among the plurality of capacitors 11 to 16, the capacitor arranged near the center is less likely to dissipate heat and tends to have a high temperature. Therefore, the detector 32 of the sensor 31 is preferably arranged near the center of the capacitor module 1. In the present embodiment, as shown in FIG. 3, the detector 32 is arranged between the first capacitor 12 and the second capacitor 15 arranged at the center. That is, the elongated portion 33 including the detector 32 of the sensor 31 is arranged in the space 51 between the curved portion 12*e* of the first capacitor 12 and the curved portion 15*e* of the second capacitor 15. Therefore, the sensor 31 can be arranged by utilizing the space 51 serving as a dead space inside the case 51 of the capacitor module 1. The detector 32 of the sensor 31 is arranged between the first capacitor 12 and the second capacitor 15 near the center of the capacitor module 1. Therefore, it is possible to detect the temperature at the center while utilizing the dead space. Therefore, the accuracy of abnormality detection can be improved. By utilizing the dead space, it is possible to downsizing the capacitor module 1 without affecting the design of the capacitor module 1.

In the present embodiment, parts of the detector 32 and the elongated portion 33 of the sensor 31 are arranged on the support surface 21*a* of the first bus bar 21 via the insulating paper 43. The first bus bar 21 has high thermal conductivity, and therefore heat generated from the capacitors 11 to 16 is transmitted through the insulating paper 43 and the first bus bar 21, and is detected by the detector 32 of the sensor 31. The sensor 31 detects the ambient temperature around the capacitors 11 to 16, but can also detect the temperature including the heat transfer through the insulating paper 43 and the first bus bar 21, and therefore the accuracy of the temperature detection of the sensor 31 can be improved.

[Effects]

According to the capacitor module 1 according to the first embodiment, it is possible to achieve the following effects.

The capacitor module 1 includes the first capacitors 11 to 13, the second capacitors 14 to 16, the first bus bar 21, the second bus bar 26, and the sensor 31. The first capacitors 11 to 13 are wound bodies of a dielectric film, and include the first electrodes 11*a* to 13*a*, the second electrodes 11*b* to 13*b* opposed to the first electrodes 11*a* to 13*a*, and the first side surfaces 11*c* to 13*c* connecting the first electrodes 11*a* to 13*a* and the second electrodes 11*b* to 13*b*. The first side surfaces 11*c* to 13*c* have the pairs of flat portions 11*d* to 13*d* and the curved portions 11*e* to 13*e* connecting the flat portions 11*d* to 13*d*, respectively. The second capacitors 14 to 16 are wound bodies of a dielectric film, and include the third electrodes 14*a* to 16*a*, the fourth electrodes 14*b* to 16*b* opposed to the third electrodes 14*a* to 16*a*, and the second side surfaces 14*c* to 16*c* connecting the third electrodes 14*a* to 16*a* and the fourth electrodes 14*b* to 16*b*. The second side surfaces 14*c* to 16*c* have the pairs of flat portions 14*d* to 16*d* and the curved portions 14*e* to 16*e* connecting the flat portions 14*d* to 16*d*, respectively. The first bus bar 21 includes the support surface 21*a* supporting the first side surfaces 11*c* to 13*c* and the second side surfaces 14*c* to 16*c* in a state where the first side surfaces 11*c* to 13*c* of the first capacitors 11 to 13 and the second side surfaces 14*c* to 16*c* of the second capacitors 14 to 16 face each other in the first direction along the support surface 21*a*, and is electrically connected to the first electrodes 11*a* to 13*a* of the first capacitors 11 to 13 and the third electrodes 14*a* to 16*a* of the second capacitors 14 to 16. The second bus bar 26 is electrically connected to the second electrodes 11*b* to 13*b* of the first capacitors 11 to 13 and the fourth electrodes 14*b* to 16*b* of the second capacitors 14 to 16. The sensor 31 includes a detector 32 for detecting an abnormality regarding the capacitor module 1. The space S1 separating the curved portions 11*e* to 13*e* of the first side surfaces 11*c* to 13*c* and the curved portions 14*e* to 16*e* of the second side surfaces 14*c* to 16*c* in the first direction is provided between the first side surfaces 11*c* to 13*c* of the first capacitors 11 to 13 and the second side surfaces 14*c* to 16*c* of the second capacitors 14 to 16. The detector 32 of the sensor 31 is arranged in the space S1.

Such configuration allows the sensor to be arranged using the dead space while enabling abnormality detection, and allows the capacitor module to be downsized without affecting the design of the capacitor module.

The sensor 31 includes the elongated portion 33 provided with the detector 32 at the tip end of the elongated portion 33, and the elongated portion 33 is arranged in the space S1.

Such configuration allows the detector 32 to be arranged near the center of the capacitor module 1. Therefore, the sensitivity of abnormality detection can be improved.

The first bus bar 21 includes the positioning portion 21*b* for positioning the elongated portion 33 on the support surface 21*a*.

With such configuration, it is not necessary to separately prepare a positioning component, and therefore the manufacturing cost of the capacitor module 1 can be suppressed. It is possible to filling properties of the resin when filling the sealing resin 52.

The positioning portion 21*b* includes the first protrusion 22 protruding from the support surface 21*a* and formed with the through hole 22*a* through which the elongated portion 33 is inserted.

Such configuration allows the elongated portion 33 of the sensor 31 to be positioned in the radial direction.

The positioning portion 21*b* includes the second protrusion 23 protruding from the support surface 21*a* and facing the detector 32 of the elongated portion 33 in the axial direction of the elongated portion 33.

Such configuration allows the elongated portion 33 of the sensor 31 to be positioned in the axial direction and the radial direction.

The second bus bar 26 includes the support member 27 supporting the elongated portion 33.

Such configuration allows positioning to be performed so that the elongated portion 33 and the electrodes of the capacitors do not come into contact with each other when the elongated portion 33 of the sensor 31 is pulled out to the outside of the case 51.

The second bus bar 26 is arranged opposed to the support surface 21*a* of the first bus bar 21 with respect to the first bus bar 21, and the support member 27 is provided at a position in the second bus bar 26 not overlapping the support surface 21*a* of the first bus bar 21.

Such configuration allows the elongated portion 33 of the sensor 31 to be positioned while utilizing the dead space, which contributes to downsizing of the capacitor module 1.

The first capacitors 11 to 13 and the second capacitors 14 to 16 are arranged such that the curved portions 11*e* to 16*e* face each other in the first direction while the flat portions 11*d* to 13*d* of the first side surfaces 11*c* to 13*c* and the flat portions 14*d* to 16*d* of the second side surfaces 14*c* to 16*c* face the support surface 21*a*.

Such configuration allows the space S1 to be provided in a part where the curved portions 11*e* to 13*e* and the curved portions 14*e* to 16*e* face each other, and the sensor 31 to be arranged in the space S1. Therefore, the capacitor module can be downsized without affecting the design of the capacitor module 1.

The sensor 31 is a temperature sensor, and the detector 32 is a heat-sensitive part for detecting a temperature.

Such configuration allows overheating of the capacitor module to be detected.

VARIATIONS

Note that in the first embodiment, an example in which the capacitor module 1 includes the six capacitors 11 to 16 has been described, but the number of capacitors is not limited to this, and is only required to be two or more.

In the first embodiment, an example in which the two first protrusions 22 are provided has been described, but the number of the first protrusions 22 may be one or more.

In the first embodiment, an example in which the support member 27 is provided on the second bus bar 26 has been described, but the support member is only required to be provided on either the first bus bar or the second bus bar. That is, the first bus bar 21 or the second bus bar 26 may include the support member 27 abutting on the outer peripheral part of the elongated portion 33 so as to press the elongated portion 33 toward the first bus bar 21 or the second bus bar 26.

In the first embodiment, an example in which the support member 27 has the claw 27*a* has been described, but the support member 27 is not limited to this as long as it has a shape allowing the elongated portion 33 of the sensor 31 to be pressed in the −Y direction. FIGS. 9A to 9E are partially enlarged views showing variations of the support member 27.

Figure 9A:
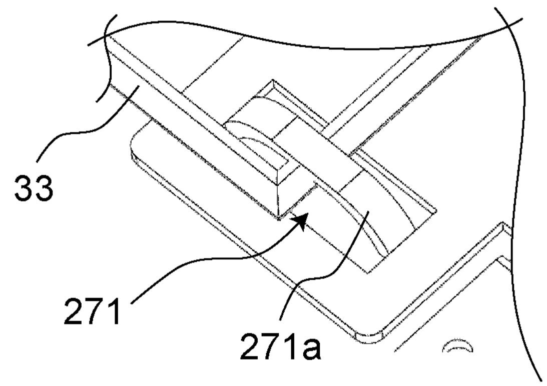
FIG. 9A is a partially enlarged view showing a variation of the support member of the capacitor module of FIG. 1.

For example, a support member 271 of FIG. 9A includes an arch-shaped claw 271*a*. By passing the elongated portion 33 through the claw 271*a* and pressing the claw 271*a*, it is possible to position the elongated portion 33.

Figure 9B:
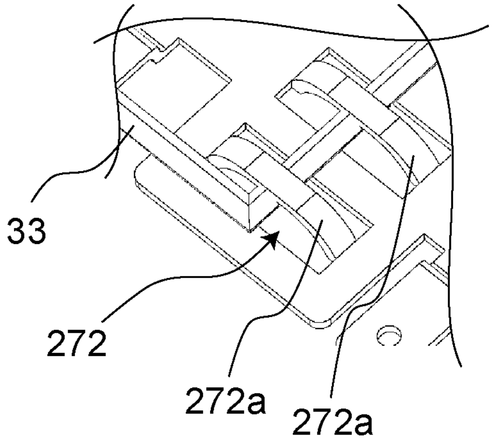
FIG. 9B is a partially enlarged view showing a variation of the support member of the capacitor module of FIG. 1.

A support member 272 of FIG. 9B is provided with two arch-shaped claws 272*a*. Since the two claws 272*a* are provided, the positioning accuracy can be further improved.

Figure 9C:
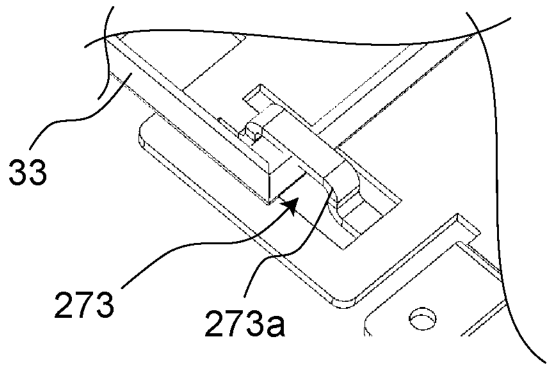
FIG. 9C is a partially enlarged view showing a variation of the support member of the capacitor module of FIG. 1.

A support member 273 of FIG. 9C is formed in a plate shape in which a claw 273*a* is bent. The claw 273*a* may have such a shape instead of an arch shape.

Figure 9D:
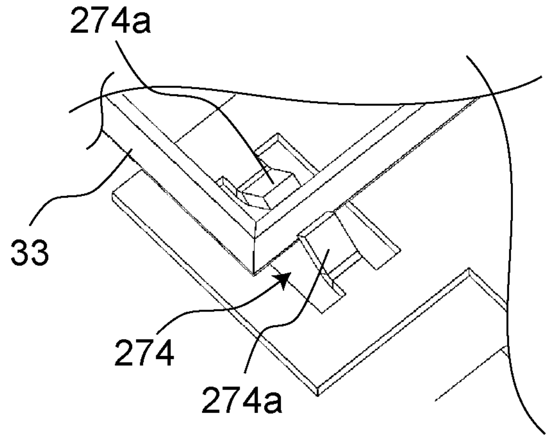
FIG. 9D is a partially enlarged view showing a variation of the support member of the capacitor module of FIG. 1.
Figure 9E:
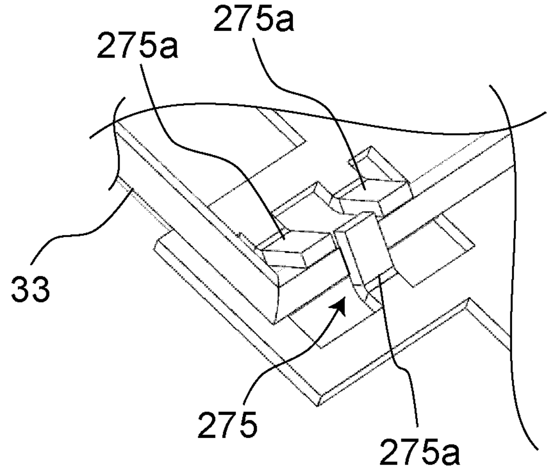
FIG. 9E is a partially enlarged view showing a variation of the support member of the capacitor module of FIG. 1.

The variations of FIGS. 9A to 9C have the arch-shaped claws 271*a* to 273*a*, but in the variations of FIGS. 9D and 9E, claws are provided so as to hold the elongated portion 33. For example, a support member 274 of FIG. 9D is provided with two claws 274*a* so as to hold the elongated portion 33. In this case, since the elongated portion 33 can be fitted from above, the arrangement of the sensor 31 becomes easy.

A support member 275 of FIG. 9E is provided with three claws 275*a* so as to hold the elongated portion 33. Positioning accuracy can be enhanced while making the arrangement of the sensor 31 easy.

Second Embodiment

A capacitor module 2 according to the second embodiment of the present invention will be described.

In the second embodiment, points different from the first embodiment will be mainly described. In the second embodiment, the identical or equivalent configurations as those of the first embodiment will be described with the same references given. In the second embodiment, description overlapping the first embodiment will be omitted.

Figure 10:
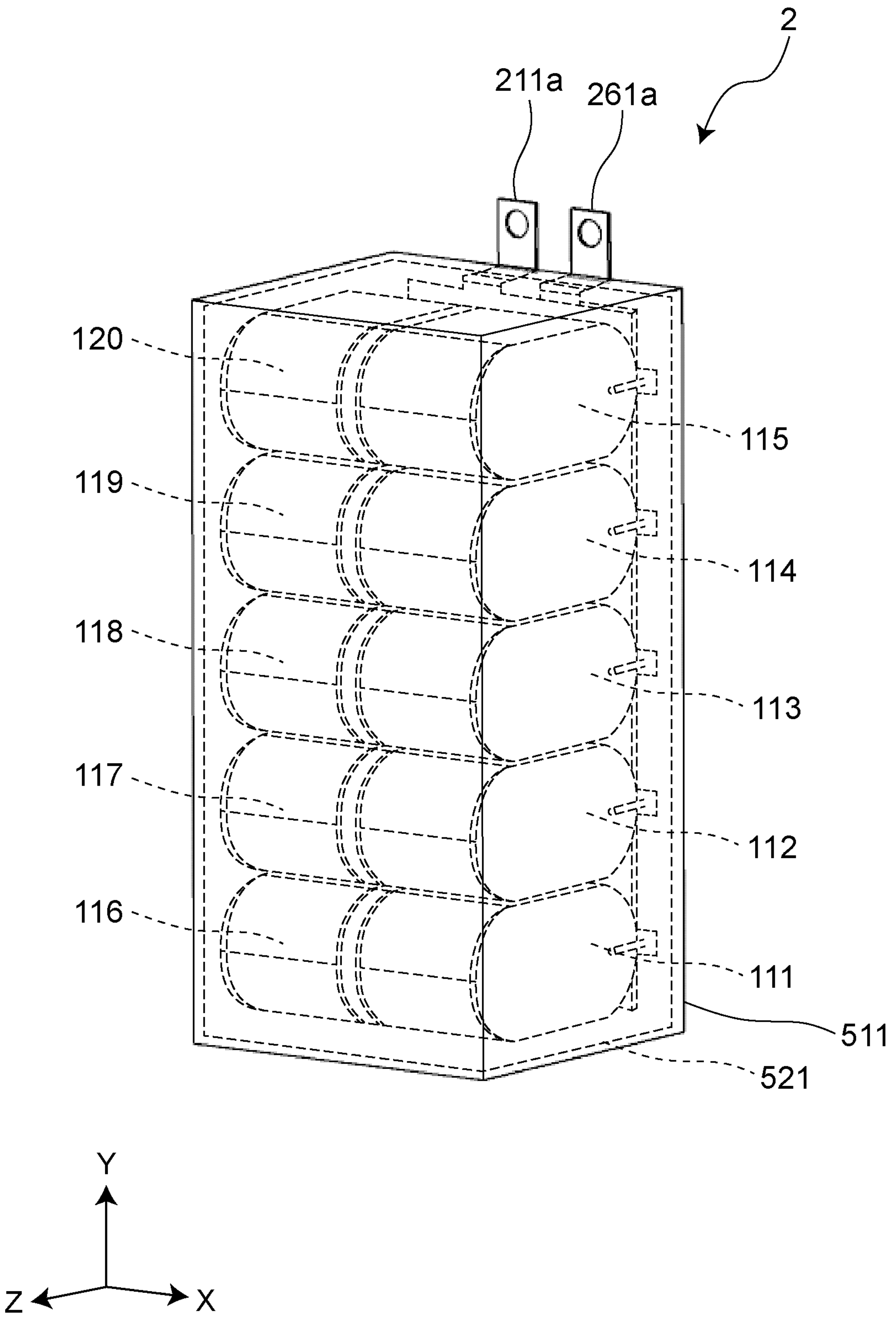
FIG. 10 is a perspective view of a capacitor module according to a second embodiment.
Figure 11A:
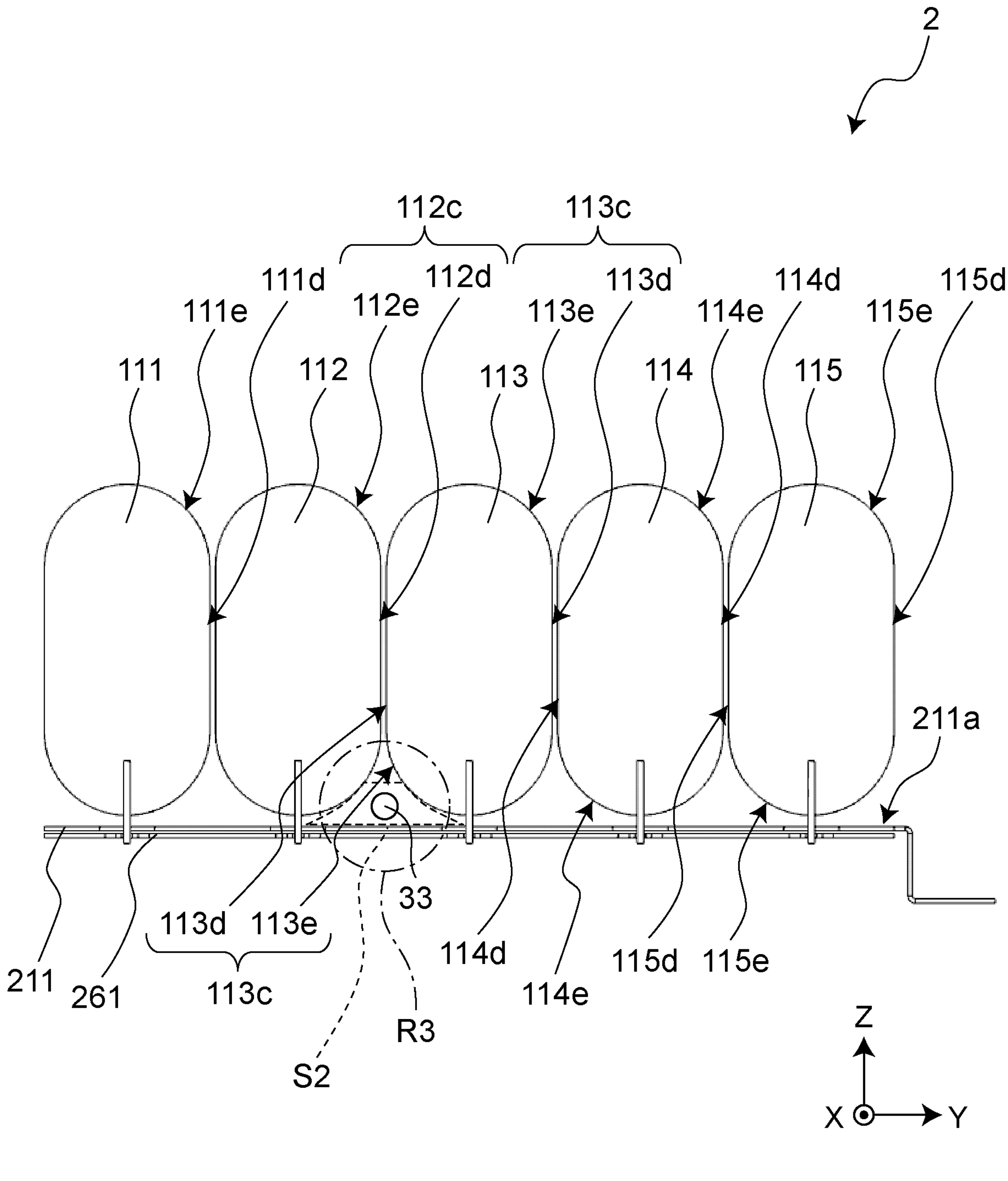
FIG. 11A is a view of the capacitor module of FIG. 10 as viewed from an X direction.
Figure 11B:
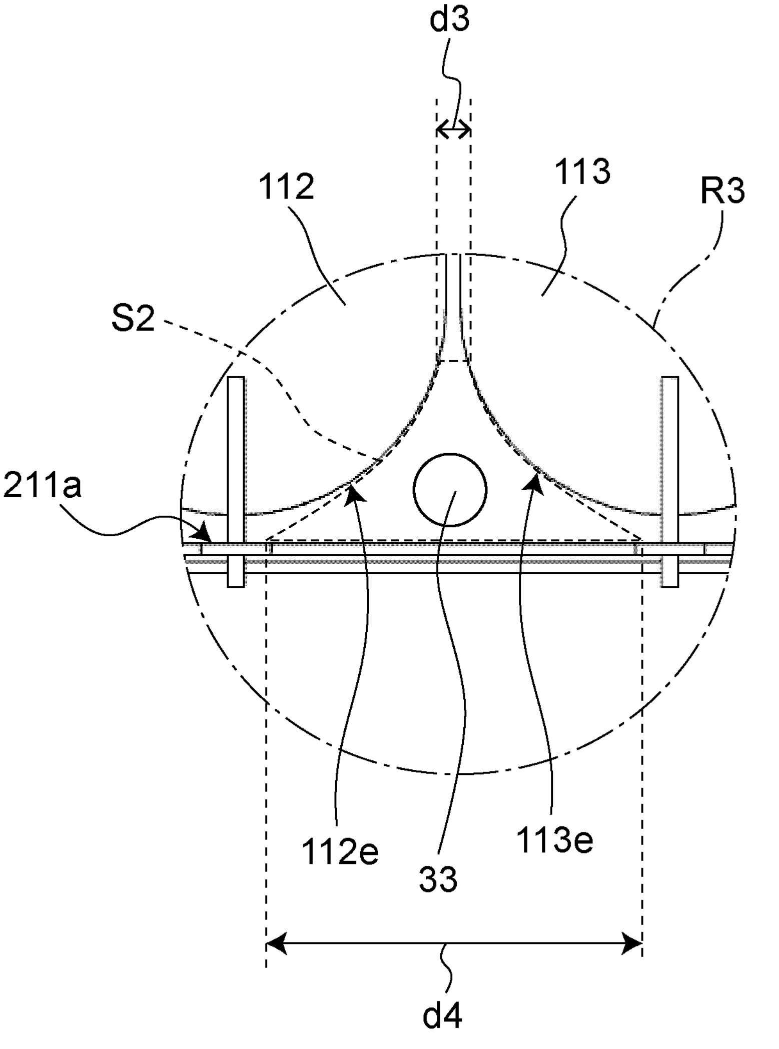
FIG. 11B is a partially enlarged view of FIG. 11A.
Figure 12:
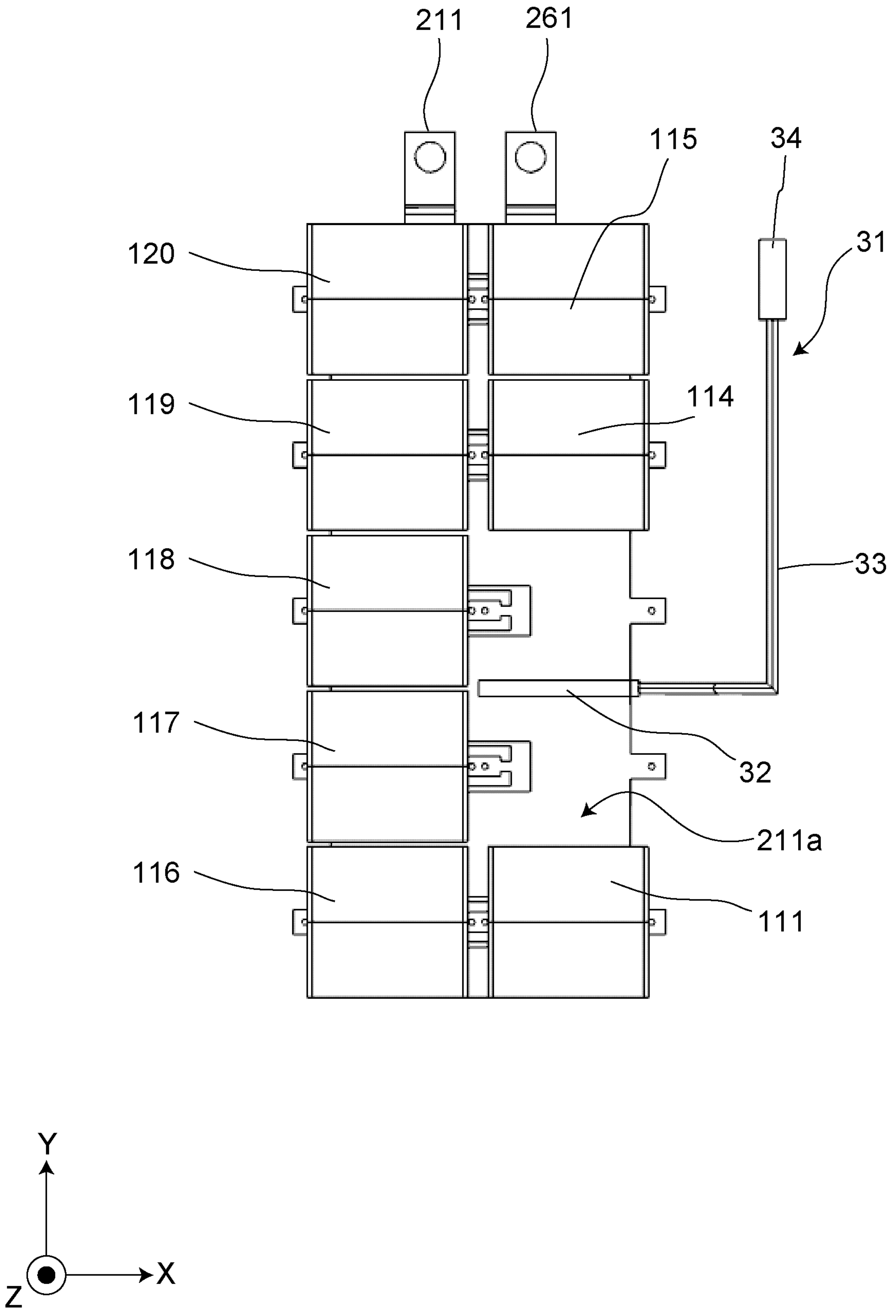
FIG. 12 is a plan view of the capacitor module of FIG. 10.

FIG. 10 is a perspective view of the capacitor module 2 according to the second embodiment. FIG. 11A is a view of the capacitor module 2 of FIG. 10 as viewed in the X direction. FIG. 11B is a partially enlarged view of FIG. 11A. FIG. 12 is a plan view of the capacitor module 2 of FIG. 10. Note that the sensor 31 is omitted in FIG. 10. In FIGS. 11A and 11B, a case 511 and a sealing resin 521 are omitted. In FIG. 12, the case 511, the sealing resin 521, and capacitors 112 and 113 are omitted.

The second embodiment is different from the first embodiment mainly in an array of capacitors. Specifically, as shown in FIGS. 10 and 11, the second embodiment is different from the first embodiment in that capacitors 111 to 115 are arranged such that not flat portions 111*d* to 115*d* but curved portions 111*e* to 115*e* (see FIG. 11) face a support surface 211*a* of a first bus bar 211.

As shown in FIG. 10, in the capacitor module 2, respective capacitors 111 to 120 are arranged in 5×2 rows. At this time, the capacitors 111 to 115 are arranged such that the flat portions 111*d* to 115*d* (see FIG. 11) of the adjacent capacitors 111 to 115 face each other in the first direction (Y direction). The capacitors 111 to 115 are arranged such that curved portions 111*e* to 115*e* face the support surface 211*a* of the first bus bar 211.

In the present embodiment, the capacitor 112 corresponds to the "first capacitor", and the capacitor 113 corresponds to the "second capacitor".

As shown in FIGS. 11A and 11B, a space S2 separating the curved portion 112*e* of a first side surface 112*c* and the curved portion 113*e* of a second side surface 113*c* from each other in the first direction (Y direction) is provided between the first side surface 112*c* of the first capacitor 112 and the second side surface 113*c* of the second capacitor 113. That is, the distance between the first side surface 112*c* and the second side surface 113*c* increases from the position where the distance becomes a shortest distance d3 toward the support surface 211*a* of the first bus bar 211, and becomes a distance d4 near the support surface 211*a*. Therefore, the space S2 is provided between the first capacitor 112 and the second capacitor 113. The elongated portion 33 of the sensor 31 is arranged in the space S2 provided between the position where the interval between the first side surface 112*c* of the first capacitor 112 and the second side surface 113*c* of the second capacitor 113 becomes the shortest distance (distance d3) and the support surface 211*a* of the first bus bar 211. That is, the elongated portion 33 of the sensor is arranged in a part (space S2) surrounded by the curved portion 112*e* of the first capacitor 112, the curved portion 113*e* of the second capacitor 113, and the support surface 211*a*. Note that the first direction is a direction along the support surface 211*a* of the first bus bar 211, and is the Y direction in the present embodiment.

By arranging the elongated portion 33 of the sensor 31 in the space S2, it is possible to achieve the same effects as those of the first embodiment. On the support surface 21*a* of the first bus bar 211, the first protrusion and/or the second protrusion may be provided in the space S2.

As shown in FIG. 12, the elongated portion 33 including the detector 32 of the sensor 31 is arranged on the support surface 211*a* of the first bus bar 211. In the present embodiment, the elongated portion 33 of the sensor 31 is arranged between the first capacitor 112 and the second capacitor 113, but the arrangement position of the sensor is not limited to this, and the sensor may be arranged, for example, between the capacitor 113 and the capacitor 114.

Although the present invention has been fully described in connection with preferred embodiments with reference to the accompanying drawings, various variations and modifications will be apparent to those skilled in the art. Such variations and modifications are to be understood as being included within the scope of the present invention as set forth in the appended claims.

The present invention is useful for capacitors used in various types of electronic equipment, electric equipment, industrial equipment, vehicle devices, and the like.

EXPLANATION OF REFERENCES

1, 2 capacitor module
11 to 13, 112 first capacitor
14 to 16, 113 second capacitor
11*a* to 13*a* first electrode
11*b* to 13*b* second electrode
14*a* to 16*a* third electrode
14*b* to 16*b* fourth electrode
11*c* to 13*c*, 112*c* first side surface
14*c* to 16*c*, 113*c* second side surface
11*d* to 16*d*, 111*d* to 115*d* flat portion
11*e* to 16*e*, 111*e* to 115*e* curved portion
21, 211 first bus bar
21*a*, 211*a* support surface
21 positioning portion
22 first protrusion
22*a* through hole
23 second protrusion
26, 261 second bus bar
27, 271 to 275 support member
31 sensor
32 detector
33 elongated portion

The invention claimed is:

1. A capacitor module comprising:

a first capacitor having a wound body of a dielectric film and including a first electrode, a second electrode opposed to the first electrode, and a first side surface connecting the first electrode and the second electrode and having a pair of flat portions opposed to each other and a pair of curved portions connecting the pair of flat portions;

a second capacitor having a wound body of a dielectric film and including a third electrode, a fourth electrode opposed to the third electrode, and a second side surface connecting the third electrode and the fourth electrode and having a pair of flat portions opposed to each other and a pair of curved portions connecting the pair of flat portions;

a first bus bar having a support surface supporting the first side surface of the first capacitor and the second side surface of the second capacitor such that the first side surface of the first capacitor and the second side surface of the second capacitor face each other in a first direction along the support surface of the first bus bar and define a space separating one of the pair of curved portions of the first side surface and one of the pair of curved portions of the second side surface in the first direction between the first side surface of the first capacitor and the second side surface of the second capacitor, the first bus bar being electrically connected to the first electrode of the first capacitor and the third electrode of the second capacitor;

a second bus bar electrically connected to the second electrode of the first capacitor and the fourth electrode of the second capacitor; and a sensor including a detector that detects an abnormality regarding the capacitor module, the detector being arranged in the space separating the one of the pair of curved portions of the first side surface and the one of the pair of curved portions of the second side surface, wherein the sensor includes an elongated portion provided with the detector at a tip end of the elongated portion, and the elongated portion is arranged in the space separating the one of the pair of curved portions of the first side surface and the one of the pair of curved portions of the second side surface, wherein the first bus bar includes a positioning portion that positions the elongated portion onto the support surface, and wherein the positioning portion includes a first protrusion protruding from the support surface, the first protrusion defining a through hole through which the elongated portion extends.

2. The capacitor module according to claim 1, wherein the positioning portion includes a second protrusion protruding from the support surface and facing the detector of the elongated portion in an axial direction of the elongated portion.

3. The capacitor module according to claim 1, wherein the first bus bar or the second bus bar includes a support member supporting the elongated portion.

4. The capacitor module according to claim 3, wherein the second bus bar is arranged opposed to the support surface of the first bus bar, and the support member is positioned in the second bus bar so as to not overlap the support surface of the first bus bar.

5. The capacitor module according to claim 3, wherein the support member is at least one claw on the second bus bar.

6. The capacitor module according to claim 5, wherein the at least one claw is arch-shaped.

7. The capacitor module according to claim 2, wherein the first bus bar or the second bus bar includes a support member supporting the elongated portion.

8. The capacitor module according to claim 1, wherein the first capacitor and the second capacitor are arranged such that the one of the pair of curved portions of the first capacitor and the one of the pair of curved portions of the second capacitor face each other in the first direction and one of the pair of flat portions of the first side surface and one of the pair of flat portions of the second side surface face the support surface.

9. The capacitor module according to claim 1, wherein the detector of the sensor is arranged between a position where a distance from the first side surface and the second side surface is shortest and the support surface of the first bus bar.

10. The capacitor module according to claim 1, wherein the sensor is a temperature sensor, and the detector is a heat-sensitive part that detects a temperature.

* * * * *